United States Patent
Corigliano et al.

(10) Patent No.: US 8,160,787 B2
(45) Date of Patent: Apr. 17, 2012

(54) CONTROL SYSTEM FOR A MOTOR VEHICLE PROVIDED WITH A SEMIAUTOMATIC GEARBOX WITH DISCRETE RATIOS

(75) Inventors: Emanuel Corigliano, Orbassano (IT);
Attilio Porta, Orbassano (IT);
Giancarlo Osella, Orbassano (IT);
Pandeli Borodani, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 554 days.

(21) Appl. No.: 12/422,633

(22) Filed: Apr. 13, 2009

(65) Prior Publication Data
US 2009/0292428 A1 Nov. 26, 2009

(30) Foreign Application Priority Data
May 26, 2008 (EP) .................................... 08425376

(51) Int. Cl.
*G06F 19/00* (2011.01)
(52) U.S. Cl. .......................................... 701/51; 701/55
(58) Field of Classification Search ................... 701/51, 701/53–56
See application file for complete search history.

(56) References Cited

U.S. PATENT DOCUMENTS

| | | | |
|---|---|---|---|
| 5,440,921 A * | 8/1995 | Matsuno et al. | 73/114.04 |
| 5,804,711 A * | 9/1998 | Remboski et al. | 73/114.05 |
| 5,870,688 A * | 2/1999 | Kanbara et al. | 701/110 |
| 5,947,862 A * | 9/1999 | Knapp et al. | 477/46 |
| 6,024,069 A * | 2/2000 | Yoshino | 123/295 |
| 6,438,945 B1 * | 8/2002 | Takagi et al. | 60/283 |
| 2004/0230367 A1 * | 11/2004 | Miller et al. | 701/111 |
| 2005/0085976 A1 | 4/2005 | Reibold | |
| 2005/0120784 A1 * | 6/2005 | Fehrenbach et al. | 73/117.3 |
| 2006/0287793 A1 | 12/2006 | Gianoglio et al. | |
| 2008/0071450 A1 * | 3/2008 | Kurrle et al. | 701/67 |
| 2008/0210181 A1 * | 9/2008 | Nakamura | 123/90.16 |
| 2009/0118990 A1 * | 5/2009 | Suzuki | 701/111 |
| 2009/0183559 A1 * | 7/2009 | Birk et al. | 73/114.27 |
| 2009/0216413 A1 * | 8/2009 | Baldet et al. | 701/54 |

FOREIGN PATENT DOCUMENTS

DE 10 2007 006 799 A1 9/2007

* cited by examiner

*Primary Examiner* — Hussein A. Elchanti
(74) *Attorney, Agent, or Firm* — Sughrue Mion, PLLC

(57) ABSTRACT

The control system comprises
- detectors or estimators capable of supplying electrical signals or data indicative of the values of predetermined state variables including the angular velocity of the crankshaft of the engine, the difference between this angular velocity and the angular velocity of the primary shaft of the gearbox, and the torque delivered by the engine crankshaft and the torque transmitted by the friction clutch;
- calculating devices capable of supplying signals indicating the errors between the values of the state variables and respective reference values;
- filter devices capable of incrementing, within a predetermined frequency band, the relative weight selectively of the error of angular velocity of the crankshaft of the engine, and of the error of the abovementioned difference of angular velocity;
- processing devices capable of generating, in accordance with predetermined transfer functions, output signals or data indicating a torque partial value or contribution to be delivered by the engine and a torque partial value or contribution to be transmitted to the primary shaft of the gearbox by the friction clutch; and
- an adder capable of adding the torque partial values or contributions to corresponding other torque partial values or contributions, to be delivered or transmitted as relevant, determined by predetermined methods, in order to supply in the total output signals or data indicating the torque to be generated in the engine crankshaft and signals or data indicating the torque to be transmitted by the friction clutch.

Figure 1:
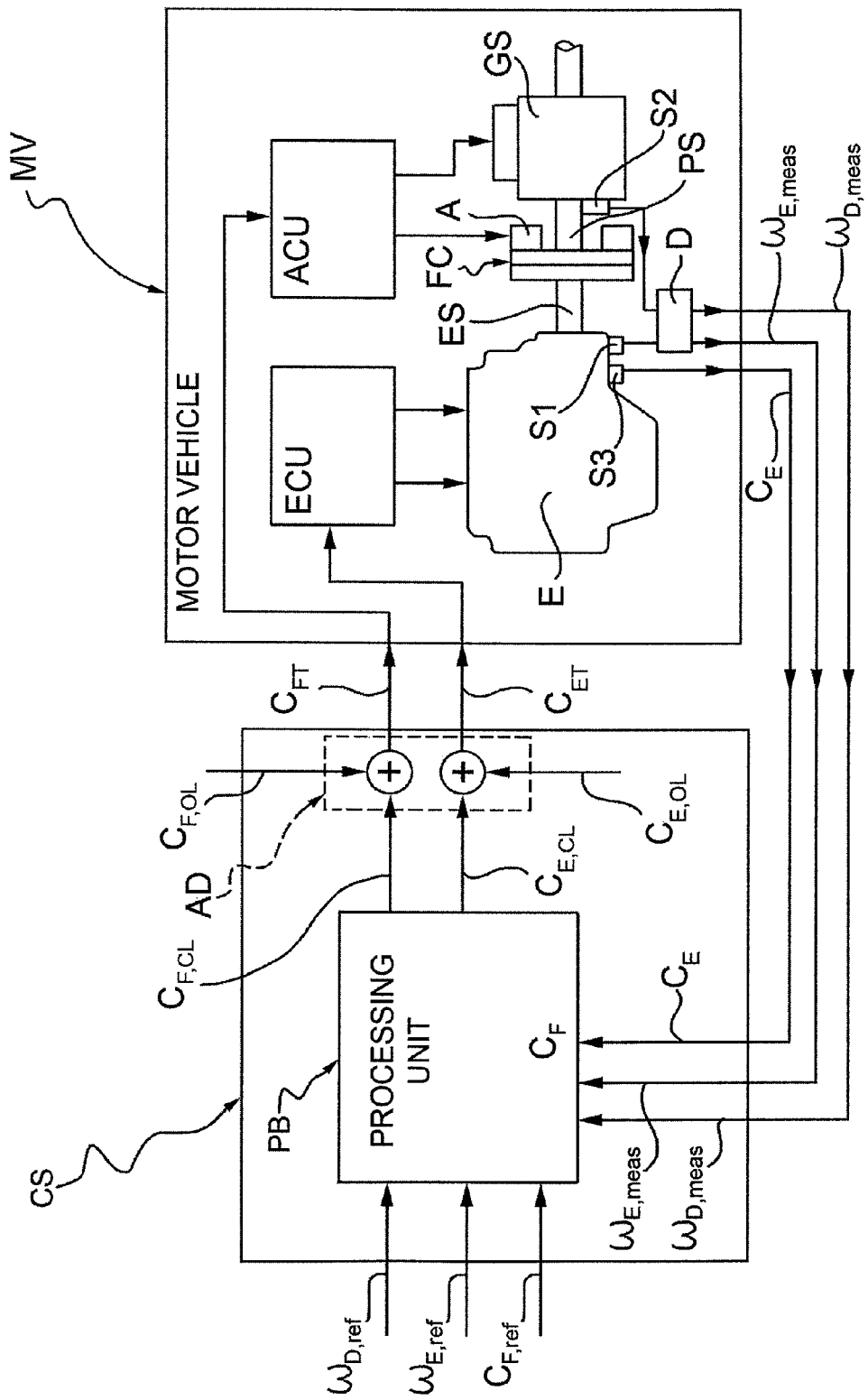

5 Claims, 2 Drawing Sheets ic a control system accord-
CONTROL SYSTEM FOR A MOTOR VEHICLE PROVIDED WITH A SEMIAUTOMATIC GEARBOX WITH DISCRETE RATIOS This invention relates to a control system for a motor vehicle provided with an engine whose crankshaft is connected to the primary shaft of a semiautomatic gearbox having discrete ratios via (at least) one friction clutch controlled by an associated actuator.

It is an object of this invention to provide a control system of this type that is particularly developed for controlling the so-called slip phase of the friction clutch, in which the torque transmitted to the primary shaft of the gearbox is varied or modulated in a controlled manner by means of this clutch.

This object and others are achieved in accordance with the invention by means of a control system of the type defined above comprising detecting or estimating means capable of supplying electrical signals or data indicating the values of predetermined state variables including the angular velocity of the crankshaft of the engine, the difference between said angular velocity and the angular velocity of said primary shaft, the torque delivered by the engine crankshaft, and the torque transmitted by the friction clutch;

calculating means capable of supplying signals or data indicating the differences or "errors" between the values detected or otherwise determined of said state variables and their reference values;

filter means capable of incrementing, within a predetermined frequency band, the relative weight selectively of the error of angular velocity of the crankshaft and of the error of the abovementioned difference of angular velocity;

processing means capable of receiving as input the signals or data coming from said calculating means partly through said filter means, and capable of generating, in accordance with predetermined transfer functions, output signals or data indicating a torque partial value or contribution to be delivered by the engine and a torque partial value or contribution to be transmitted to the primary shaft by the friction clutch; and adder means capable of adding said torque partial values or contributions to corresponding other torque partial values or contributions, to be delivered or transmitted as relevant, determined by predetermined methods, in order to supply in the total output signals or data indicating the torque to be developed in the engine crankshaft and signals or data indicating the torque to be transmitted by said friction clutch.

The abovementioned filter means are preferably designed to perform an essentially low-pass filtering action, in particular an integrating action.

The system is appropriately provided with means capable of multiplying by respective gain factors whose values are predetermined on the basis of the speed ratio or gear engaged in the gearbox, the abovementioned error signals or data coming from the calculating means partly via the abovementioned filter means.

The abovementioned processing means may appropriately comprise a phase advance network acting on the torque error generated by the engine, and a filter network capable of performing an essentially low-pass action, in particular an integrating action, on the error of the torque transmitted by the friction clutch.

Figure 2:
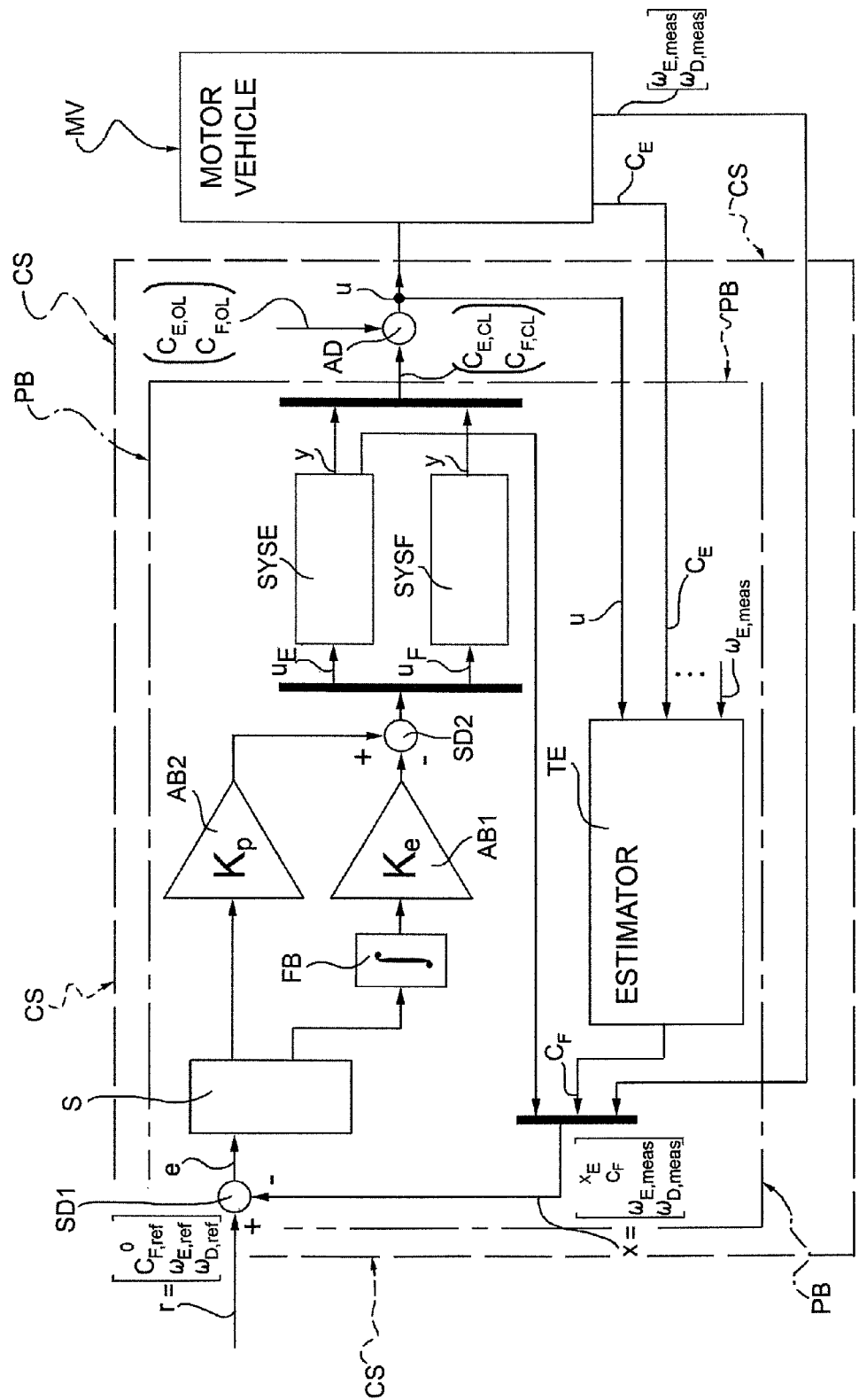

Further features and advantages of the invention will be clear from the following detailed description, which is given purely by way of non-restrictive example with reference to the appended drawings, in which:

FIG. 1 is a block diagram showing a control system according to the invention fitted to a motor vehicle; and FIG. 2 is a block diagram showing in greater detail the architecture of a control system according to the present invention.

In FIG. 1 the reference MV denotes a motor vehicle fitted with a control system CS according to the invention.

Certain parts of the motor vehicle MV are shown, in diagrammatic form only: the engine E, the crankshaft ES of which is connected to the primary shaft PS of a gearbox GS with discrete ratios via a friction clutch FC controlled by an actuator A.

The engine E and the actuator A have respective electronic control units ECU and ACU.

S1 and S2 denote two angular velocity sensors connected to the engine E crankshaft ES and to the gearbox GS primary shaft PS, respectively.

The signals or data supplied by the sensors S1 and S2 can be used directly by the control system CS. Alternatively, as shown in the block diagram, FIG. 1, the signals supplied by these sensors pass through a device D which feeds the control system CS with signals or data representing the angular velocity $\omega_{E,\ meas}$ of the engine E crankshaft, and the difference $\omega_{D,\ meas}$ between said angular velocity and that of the primary shaft PS of the gearbox GS.

The advantage of controlling the velocity difference $\omega_{D,\ meas}$ is that it simplifies the control of enabling and of resets in the vicinity of synchronization (equalization) of the angular velocities measured with the corresponding reference values which will be discussed later. Also, it is possible to directly control the way in which the velocities synchronize with each other, whereas if both velocities were to be controlled (instead of one velocity and their difference), it would be more difficult to ensure comfortable synchronization because there would be the negative effect of two tracking errors.

The engine E is also provided with another sensor S3 to supply the control system CS with signals or data representing the torque $C_E$ delivered by the engine E.

As an alternative to direct detection by means of sensors, the state variables referred to above can be determined by other means known per se, such as estimation algorithms.

Referring to FIG. 1, the control system CS essentially comprises a processing unit PB which receives the values of the state variables $\omega_{E,\ meas}$, $\omega_{D,meas}$ and $C_E$. As will become clearer later, on the basis of the acquired values of these state variables, the processing unit PB estimates the torque $C_F$ transmitted by the friction clutch FC.

A processing unit PB also receives reference values $\omega_{E,\ ref}$, $\omega_{D,\ ref}$ and $C_{F,\ ref}$.

On the basis of the acquired values of the state variables defined above, together with the reference values input to it, the processing unit PB generates, in a manner which will be described below with reference to FIG. 2, output signals or data indicative of a torque partial value or contribution $C_{E,\ CL}$ to be delivered by the engine E, and indicative of the torque partial value or contribution $C_{F,\ CL}$ to be transmitted to the primary shaft of the gearbox by the friction clutch FC.

In an adder device, denoted by the general reference AD, to the abovementioned torque partial values or contributions are added corresponding other torque partial values or contributions $C_{E,\ OL}$ and $C_{F,\ OL}$ to supply as a total output signals or data indicating the torque $C_{ET}$ to be delivered by the engine E, and others indicating the torque $C_{FT}$ to be transmitted by the friction clutch FC. These signals or data are supplied to the control units ECU and ACU connected to the engine E and friction clutch FC, respectively. Torque contributions $C_{E,\,OL}$ and $C_{F,\,OL}$ are termed open-loop torque contributions and can be determined for example by the method described in the previous European patent EP-1198365-B1 in the name of the present Applicant.

Torque contributions $C_{E,\,CL}$ and $C_{F,\,CL}$, which can be termed closed-loop contributions, are actually determined by the control system CS according to the invention in such a way that, during phases in which the friction clutch FC is modulating the torque transferred to the primary shaft of the gearbox GS, the angular velocity $\omega_E$ of the engine E crankshaft, the angular velocity difference $\omega_D$ between the engine crankshaft ES and the primary shaft PS, and the torque $C_F$ transmitted by the clutch follow the corresponding reference values input to the processing unit PB.

In FIG. 2, parts and elements already described are given the same alphanumeric references as before.

For simplicity of illustration, in FIG. 2 the state variables and associated reference values have been represented in vector form.

Referring to this figure, the processing unit PB comprises a subtractor device SD which outputs a vector e representing the difference between the values of the vector X of the controlled state variables and the values of the vector r which is the vector of the respective reference values.

The values of vector e indicate the differences or "errors" between the detected values (or values determined in some other way) of the abovementioned state variables and the respective associated reference values.

The vector e is sent to a selector device S which separates its values into two groups:
- a first group of values, which includes the error of the angular velocity of the engine E crankshaft and the error of the angular velocity difference between this crankshaft and the primary shaft PS of the gearbox, pass through a filter unit FB, which performs on them an essentially low-pass action, in particular a substantially integrating action; the data thus filtered arrive at an "amplifier" unit denoted AB1 in which they are multiplied by a gain factor $K_e$ that can take predetermined values differentiated on the basis of the velocity ratio or gear engaged in the gearbox GS;
- the rest of the data of vector e go directly to another "amplifier" unit denoted AB2, where they are multiplied by a gain factor $K_p$ which also takes values that can be differentiated on the basis of the speed ratio or gear engaged in the gearbox GS.

The action of the filter unit or integrator FB is fundamental to the improvement of the accuracy of tracking of the reference values by the more important priority state variables. The data output by the "amplifier" units AB1 and AB2 arrive at another subtractor SD2, whose output is connected to the inputs of two processing networks SYSE and SYSF.

Processing network SYSE operates on the data relating to the determination of the torque contribution $C_{E,\,CL}$ to be delivered by the engine E, and performs an essentially derivative action, in order to make up for the delay in the response of the engine E. This network is essentially a phase advance network.

The processing network SYSF operates on the data relating to the determination of the torque contribution $C_{F,\,CL}$, and is for example be a low-pass filter or an integrator. The presence of this SYSF network is fundamental to being able to turn the torque $C_F$ transmitted by the clutch into a controllable state variable, so that it can be forced to track a corresponding suitable reference value. The low-pass filtering or integration is also useful to derive a continuous command for the actuator A of the clutch FC, avoiding sudden torque oscillations in the drive line which would give unpleasant sensations to the user of the motor vehicle.

In FIG. 2, $X_E$ and $Y_E$ represent the vector of internal states and the scalar output of the SYSE network, respectively, while $Y_F$ represents the scalar output of the SYSF network.

At the output of the SYSE and SYSF networks, the torque partial values or contributions $C_{E,\,CL}$ and $C_{F,\,CL}$ arrive at the inputs of the adder device AD, which outputs a vector u containing the values $C_{ET}$ and $C_{FT}$ indicating, respectively, the torque to be generated by the engine E crankshaft, and the torque to be transmitted to the primary shaft of the gearbox by the clutch FC.

The vector u is also sent to the input of an estimator TE, which also receives the value of the torque $C_E$ developed by the engine E and the angular velocity $\omega_{E,\,meas}$ of the crankshaft of this engine.

The estimator TE is based on the simplified mathematic model which, by using the values of the abovementioned state variables, and optionally also other quantities internal to the control itself, supplies an estimate of the torque $C_F$ transmitted by the clutch FC. This estimate, not being based on the nominal so-called "transmissibility map" characteristic of the particular clutch FC used, is "robust" even as the clutch wears and the actuator ages, and even in the event of changes in the transmission characteristic of the clutch due to particular physical events such as for example rapid thermal changes.

Clearly, without departing from the principle of the invention, the embodiments and details of construction can differ considerably from those described and illustrated purely by way of non-restrictive example, without thereby departing from the scope of the invention as defined in the appended claims.

For example, the SYSE and SYSF networks may be designed to perform a generic transfer function corresponding to the objectives of the control effected and congruent with the characteristics of the controlled physical system.

What is claimed is:

1. A control system for a motor vehicle provided with an engine whose crankshaft is connected to the primary shaft of a semiautomatic gearbox having discrete ratios, through at least one friction clutch controlled by an associated actuator; the control system comprising detecting or estimating means capable of supplying electrical signals or data indicating the values of predetermined state variables including the angular velocity of the crankshaft of the engine, the difference between said angular velocity and the angular velocity of said primary shaft, the torque delivered by the engine crankshaft, and the torque transmitted by the friction clutch;

calculating means capable of supplying signals or data indicating the differences or errors between the values detected or otherwise determined of said state variables and their reference values;

filter means capable of incrementing, within a predetermined frequency band, the relative weight selectively of the error of angular velocity of the crankshaft of the engine, and of the error of the abovementioned difference of angular velocity;

processing means capable of receiving as input the signals or data coming from said calculating means partly through said filter means, and capable of generating, in accordance with predetermined transfer functions, output signals or data indicating a torque partial value or contribution to be delivered by the engine and a torque partial value or contribution to be transmitted to the primary shaft of the gearbox by the friction clutch; and adder means capable of adding said torque partial values or contributions to corresponding other torque partial values or contributions, to be delivered or transmitted as relevant, determined by predetermined methods, in order to supply in the total output signals or data indicating the torque to be generated in the engine crankshaft and signals or data indicating the torque to be transmitted by said friction clutch.

2. A control system according to claim 1, in which the abovementioned filter means are designed to perform an essentially low-pass filtering action, in particular an integrating action.

3. A control system according to claim 1, comprising amplifier means capable of multiplying by respective gain factors whose values are preferably predetermined on the basis of the speed ratio or gear engaged in the gearbox, the abovementioned error signals or data coming from the calculating means partly via the abovementioned filter means.

4. A control system according to claim 1, in which the processing means comprise
a phase advance network acting on the torque error generated by the engine, and
a filter network capable of performing an essentially low-pass action, in particular an integrating action, on the error of the torque transmitted by the friction clutch.

5. A control system according to claim 1, comprising estimator means for providing signals or data indicating the values of at least one predetermined state variable, in particular that of the torque transmitted by the friction clutch.

* * * * *